(12) United States Patent
Toyama et al.

(10) Patent No.: US 7,751,317 B2
(45) Date of Patent: Jul. 6, 2010

(54) COST-AWARE NETWORKING OVER HETEROGENEOUS DATA CHANNELS

(75) Inventors: Kentaro Toyama, Bangalore (IN); Rohan Narayan Murty, Bangalore (IN); Chandramohan A. Thekkath, Palo Alto, CA (US); Ranveer Chandra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 11/342,147

(22) Filed: Jan. 26, 2006

(65) Prior Publication Data

US 2007/0171915 A1    Jul. 26, 2007

(51) Int. Cl.
*H04L 12/26* (2006.01)
*G06F 15/173* (2006.01)
*G06F 9/46* (2006.01)

(52) U.S. Cl. .................... 370/230; 370/252; 370/395.4; 709/226; 718/102

(58) Field of Classification Search ................. 370/230, 370/252, 395.4; 709/226; 718/102
See application file for complete search history.

(56) References Cited

U.S. PATENT DOCUMENTS

| 5,442,791 | A  | * | 8/1995  | Wrabetz et al.    | 719/330  |
| 5,787,237 | A  | * | 7/1998  | Reilly            | 358/1.13 |
| 6,460,082 | B1 | * | 10/2002 | Lumelsky et al.   | 709/226  |
| 6,728,270 | B1 | * | 4/2004  | Meggers et al.    | 370/514  |
| 7,124,409 | B2 | * | 10/2006 | Davis et al.      | 717/178  |
| 7,228,535 | B2 | * | 6/2007  | Frossard et al.   | 717/158  |
| 7,457,243 | B2 | * | 11/2008 | Meggers et al.    | 370/230  |
| 7,516,455 | B2 | * | 4/2009  | Matheson et al.   | 718/102  |
| 7,584,165 | B2 | * | 9/2009  | Buchan            | 706/60   |
| 2008/0298313 | A1 | * | 12/2008 | Salminen        | 370/329  |

* cited by examiner

*Primary Examiner*—Alpus H Hsu
(74) *Attorney, Agent, or Firm*—Klarquist Sparkman, LLP

(57) ABSTRACT

Disclosed herein are scheduling techniques for transmitting time-critical data in a cost-aware manner over a network comprising a plurality of heterogeneous transmission interfaces. The scheduling problem is formulated as a linear programming problem with the deliver-by deadlines of the various data blocks as hard constraints and minimizing cost set as an objective (soft) constraint. The problem is simplified by assuming data blocks with the earliest deadlines should be scheduled first and the most aggressive interfaces should be used first. To formulate the linear programming problem, the time domain is divided into bins and various bin-level schedules are enumerated for switching the transmission of the data over various transmission interfaces. The linear programming techniques are applied to the various bin configurations and the least costly of the resulting transmission schedule is selected for submission to a switching layer.

24 Claims, 11 Drawing Sheets

COST-AWARE NETWORKING OVER HETEROGENEOUS DATA CHANNELS

FIELD

The field relates to data transmission over a communications network. More particularly, the field relates to intelligent data transmission over a communications network comprising a heterogeneous set of transmission interfaces with heterogeneous properties and characteristics associated therewith.

BACKGROUND

Among the changes wrought by the rise of ubiquitous computing has been the increase in the number of communication mediums that any one device has access to at any given time. As a result, at any one time, many devices today have multiple communication mediums ("interfaces") over which they can send and receive data. For example, upper-end mobile phones and Personal Digital Assistants (PDAs) could conceivably send data over such varied interfaces as Short Message Service (SMS), voice, GPRS, Bluetooth, WiFi, and/or over the wire (e.g., Digital Subscriber Line (DSL), cable modem, etc.).

Each of these heterogeneous communication interfaces potentially has different inherent performance capabilities. Furthermore, in today's world, not only are there numerous types of interfaces for communicating, but, since each device plays multiple roles, the types of data that needs to be transmitted thereon is also numerous. Thus, there is a need to intelligently match the type of data to be communicated with an appropriate configuration of the communication interfaces to meet the expected levels of performance.

Traditional networks did not comprise a heterogeneous set of communication mediums. For instance, computers sent data over a single modem at a particular bit rate. Thus, traditional measurements of performance, also known as Quality of Service (QoS), was limited to such notions as limiting lost data packets and quality of the voice-over and so forth. However, in addition to the traditional notions of performance, it is important to note that each of these heterogeneous interfaces has an associated cost (e.g., a monetary cost, or a power-consumption cost) that should also be considered, so that data can be sent in a cost-aware way, while achieving specified levels of performance.

SUMMARY

Described herein are methods and systems for transmitting data over a network with heterogeneous data transmission mediums in a cost-aware manner. The network comprises a plurality of different transmission interfaces each with potentially different performance capabilities and costs. The data to be transmitted can also be heterogeneous in terms of the time deadlines by which they are to be delivered to their destination. Thus, in one aspect, the methods described herein determine a transmission schedule that schedules the use of the various heterogeneous interfaces so that the various deadlines for data delivery are met while minimizing the cost associated with the data transmission. The cost-optimized schedule, in one aspect, is derived by applying linear programming techniques to solve an optimization problem with the deliver-by deadlines as hard constraints and minimizing cost as the soft constraint. One exemplary linear programming technique to be used is applying a Simplex algorithm.

In another aspect, the network interfaces are versions of a unified transmission interface, which are derived as some combination of distinct transmission interfaces available for use in transmission. This simplifies the linear programming problem. To further simplify the problem, the desired schedule is constrained with the assumption that the order of use of the various interfaces begins with the most aggressive interface and ends with the least aggressive interface. In a further constraint, the order of data blocks in the transmission schedule is specified as starting with a data block with the earliest delivery deadline to one with the latest deadline. This too reduces the complexity of the scheduling problem.

In another aspect, to structure solving for the schedule as a linear programming problem, the time domain over which the desired schedule lies is divided into time bins. In one aspect, the time bins are derived based on the deliver-by deadlines. In another aspect, the bins are configured with various bin-level schedules indicating estimated switching of transmission across the various transmission interfaces. Then, for each of the bin configurations, the deliver-by deadlines are applied as hard constraints and cost is applied as an objective constraint to derive a cost-optimized transmission schedule for each bin-configuration. Then, the transmission schedules, cost-optimized at the bin level, are compared to select the least costly one as the schedule to be submitted to a switching layer for transmission.

To accommodate changes in the transmission environment, such as the changes in the available bandwidth and arrival of new data to be transmitted, the cost-optimized transmission schedule is re-calculated upon detecting such changes.

In other aspects, not all bin configurations need be explored. For instance, if a transmission schedule of the most aggressive bin configuration fails any of the deliver-by deadlines, then the less aggressive bin configurations are not explored using linear programming techniques. In a further example, if the analysis of a bin configuration yields a schedule that meets the deadlines then the rest of the bin configuration selected for further analysis include those that are less aggressive and thus, less costly. Also, in another aspect, selected bandwidth capacity over the unified transmission interface can be reserved for high priority data by simply considering the reserved bandwidth as not being available for transmission. In a further aspect the derived cost-optimized schedule of transmission can be buffered by reducing the deliver-by deadlines by selected amount of time.

The foregoing and other objects, features, and advantages of the technology will become more apparent from the following detailed description, which proceeds with reference to the accompanying figures.

DETAILED DESCRIPTION

An Exemplary Overall Cost-Aware QoS Model

Figure 1:
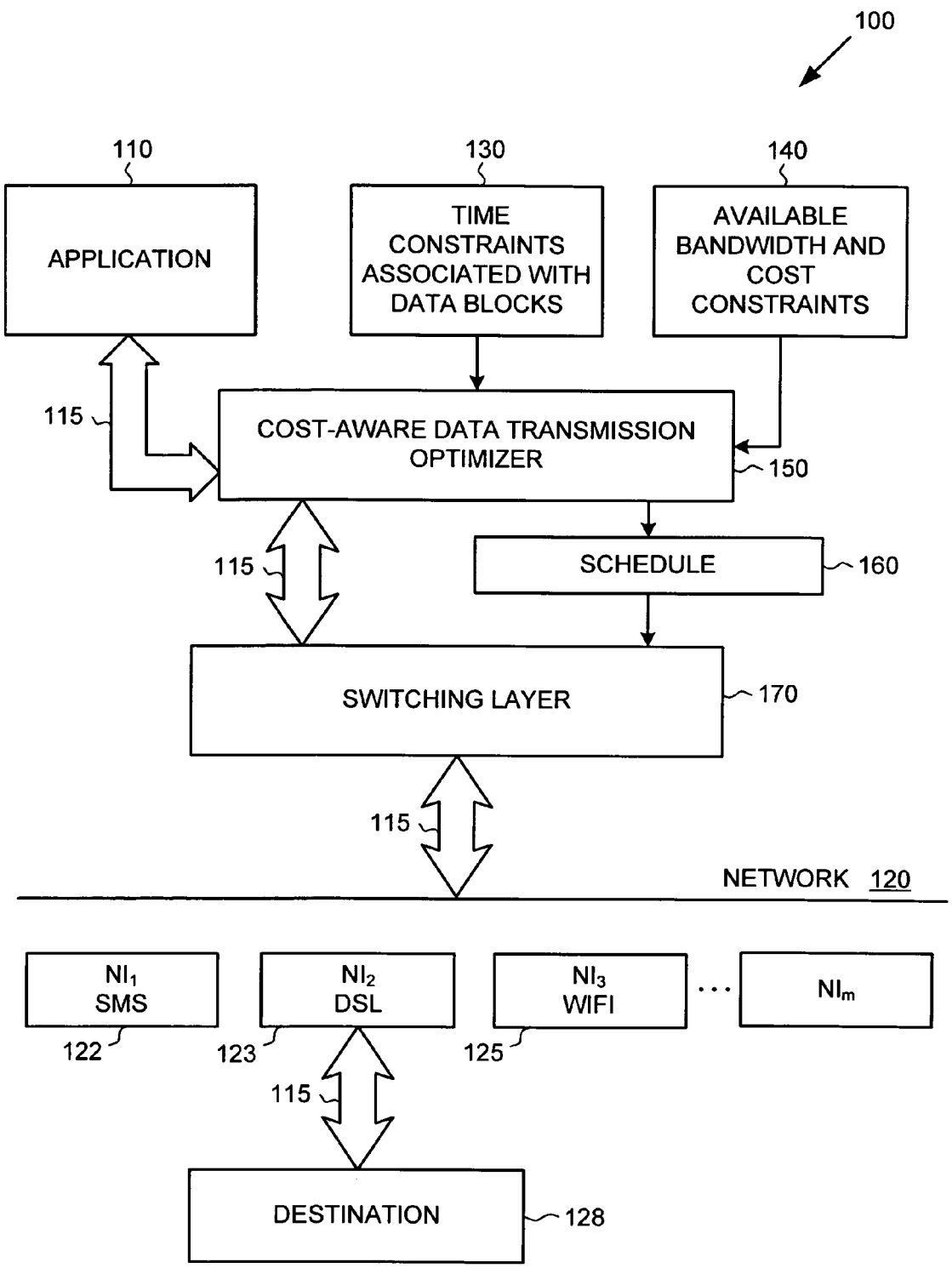
FIG. 1 is a block diagram illustrating an exemplary system for transmitting data over a heterogeneous network in a cost-aware manner.

An exemplary system 100 for cost-aware transmission of data based on a cost-aware QoS model for applications that need to communicate data over a heterogeneous network is described with reference to FIG. 1. According to FIG. 1, an application 110 submits data via a dataflow 115 to the network 120. The data flow 115 may be routed through the network 120 via one or more of the various heterogeneous communication interfaces or some combination thereof (e.g., 122, 123 and, 125). The choice of which of the interfaces (e.g., 122, 123, and 125) should be selected can be based at least in part on the required performance including a time within which the data should reach the destination 128.

However, not all data is associated with the same delivery time. Thus, in one embodiment, the data to be communicated is reduced to blocks of data $\Pi_i$ (e.g., data packets, individual files, which need not be of the same size) each of which has a deadline $\tau_i$ as shown at 130. To attain the ideal QoS, the $\Pi_i$ bytes of data should be transferred in time within the deadlines $\tau_i$. Thus, a plurality of data blocks or units $\Pi_i$ each with a deadline $\tau_i$ is submitted as an input 130 to a cost-ware data transmission optimizer 150. The optimizer 150 determines a schedule 160 with a hard constraint that an acceptable schedule is one where the delivery deadlines are met and a soft constraint that cost should be minimized.

In one exemplary form, the schedule 160 comprises periods of time for which each interface (e.g., 122, 123, and 125) or a combination thereof is scheduled to transfer data $\Pi_i$ to be delivered within the deadline $\tau_i$. Since different interfaces (e.g., 122, 123, and 125) have different characteristics, such as latency, throughput, availability, etc., the optimizer 150 has to determine how long each one of these interfaces must be used to transfer data such that the deadlines in the pipeline are met. Additionally, each network interface (e.g., 122, 123, and 125) has a current available capacity $B_m$ (e.g., in bandwidth) and a cost Cm (e.g., in terms of a monetary rate, power consumption, or other forms of cost) associated therewith, as shown at 140. As a result, an exemplary optimal schedule 160 is one in which the overall cost is minimized and all feasible deadlines are met. This is one succinct exemplary representation of generic QoS for a class of applications that require bounded blocks or chunks of data to be transferred in a specified period of time. For example, this abstraction captures the complexity of file transfer programs, e-mail, etc. Once the schedule is generated it is submitted to a switching layer 170, which controls switching of the data flow 115 via the various network interfaces (e.g., 122, 123, and 125). The techniques of cost-aware transmission described herein can be applied equally well regardless of the source or the destination and hence, regardless of the direction of the traffic. The cost Cm need not be restricted to a monetary rate. Instead, it could represent a broader measure such as loss of QoS over the entire network.

Figure 2:
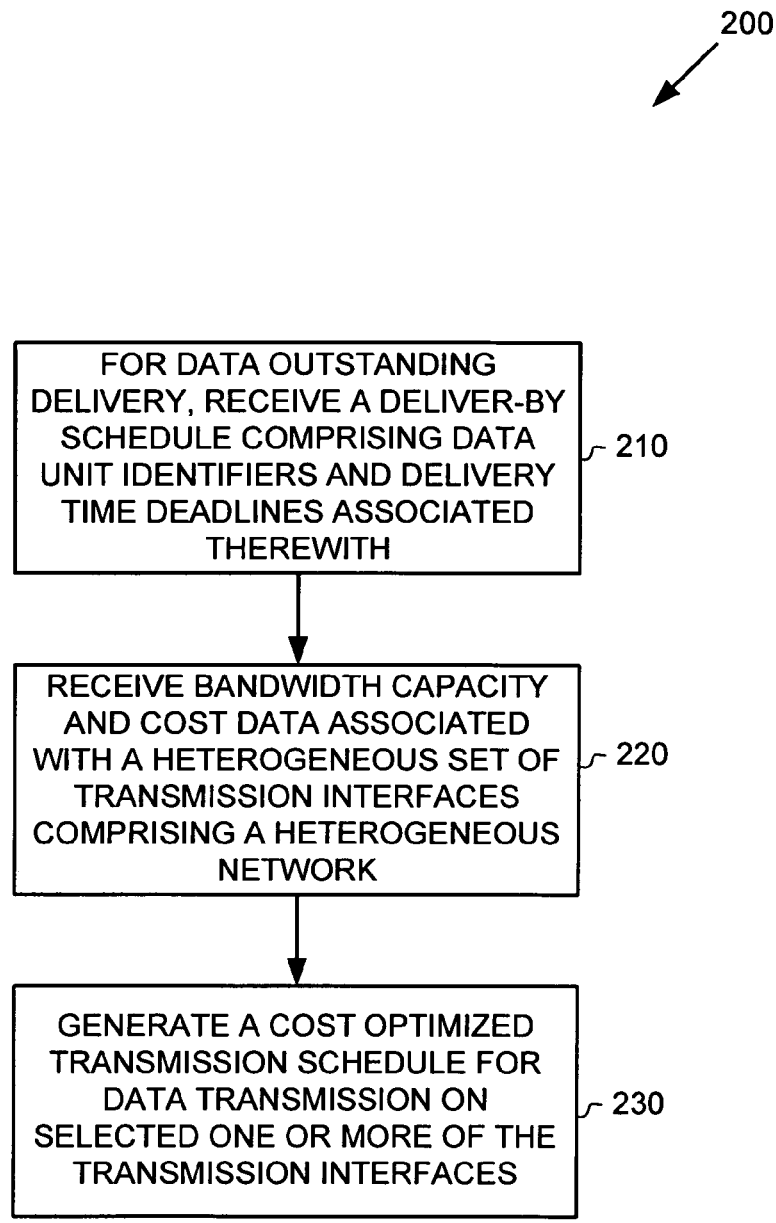
FIG. 2 is a flow diagram illustrating an exemplary overall method for determining a cost-optimized transmission schedule for transmitting data over a heterogeneous network.

An Exemplary Overall Method for Determining an Optimized Schedule for Transmitting Data Over a Heterogeneous Network FIG. 2 illustrates an overall method that can be implemented in the cost-aware data transmission optimizer 150 of FIG. 1. At 210, the cost-aware transmission optimizer receives data identifying the various data blocks that are outstanding delivery and their corresponding deadlines for the delivery. At 220, the cost-aware transmission optimizer 150 receives data related to the available bandwidth capacity and the cost associated with such available bandwidth for the network interfaces (e.g., 122, 123 and 125 of FIG. 1). Based at least on the data of 210 and 220, at 230, the cost-aware transmission optimizer 150 determines an optimized schedule for transmitting the various data units not only within their respective deadlines, but also at the lowest cost. Linear programming techniques (e.g., as described herein), are used to determine the optimal schedule. The configurations of steps 210, 220, and of method 200 is exemplary, other embodiments can combine or reorder the steps.

Figure 3:
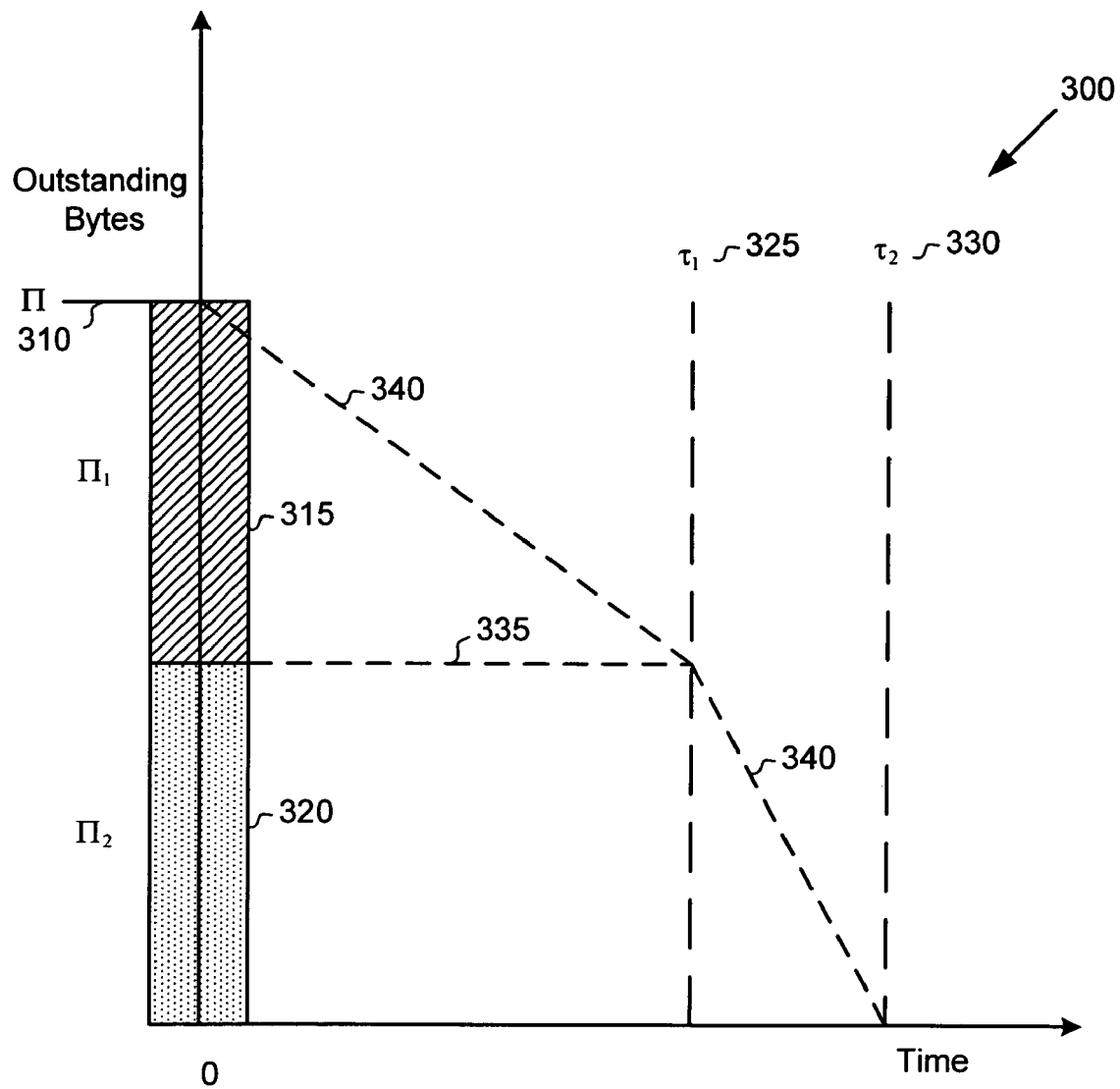
FIG. 3 is a block diagram illustrating an exemplary linear programming model for formulating the problem of determining the cost-optimized transmission schedule which meets the appropriate data delivery deadlines.

Exemplary Modeling of the Problem of Finding an Optimized Data Schedule for Transmitting Data Over a Heterogeneous Network FIG. 3 illustrates an exemplary modeling of the problem of determining an optimal data transmission schedule represented as linear curve in a domain 300 of data outstanding delivery measured in bytes (y-axis) and the schedule of transmission in time (x-axis). In the exemplary model of FIG. 3, the data outstanding delivery (e.g. $\Pi$ at 310) comprises two exemplary blocks of data, $\Pi_1$ at 315 and $\Pi_2$ at 320, having corresponding deadlines $\tau_1$ at 325 and $\tau_2$ at 330. The objective can then be modeled as finding a schedule of transmission over available bandwidth such that data $\Pi_1$ 315 is delivered by time $\tau_1$ 325 and data $\Pi_2$ 320 s delivered by $\tau_2$ 530 while ensuring that it is done in a cost-minimized manner. A schedule is modeled as a curve in the domain 300.

FIG. 3 also illustrates an underlying assumption that to have better chances of meeting all deadlines (e.g., $\tau_1$ at 325 and $\tau_2$ at 330), the order of transmission of data blocks (e.g. $\Pi_1$ at 315 and $\Pi_2$ at 320) is based on their respective deadlines. The data block with the earliest deadline (e.g., $\Pi_1$ at 315) is scheduled to be transmitted first. The dotted line 335 represents the x-axis being shifted up to illustrate that by time $\tau_1$ at 325, a total of $\Pi_1$ bytes at 315 has been transferred. Thus, the curve along 340 in some sense represents the upper bound within which a cost optimized schedule may lie. Also, it is evident that any other curve below the upper bound curve 340 meets all deadlines. Thus, the problem can be formulated as finding a solution curve below the upper bound curve 340 that minimizes the overall costs. In this manner, the problem is cast as one of linear programming (LP) with time deadlines as hard constraints and cost as a soft or objective constraint.

Linear programming (LP) problems are in general optimization problems well known in field of operations research (OR) in which the objective function and the constraints are all linear. A number of different algorithms have been proposed for solving linear programming problems. The Simplex algorithm is one among them and solves linear programming problems by constructing an admissible solution at a vertex of the polyhedron, and then walking along edges of the polyhedron to vertices with successively higher values of the objective function until the optimum is reached. Other linear programming techniques include, but are limited to, the Mehrotra predictor-corrector method, the Khachiyan polynomial-time algorithm for linear programming problem, and the Karmarkar projective method.

Figure 4:
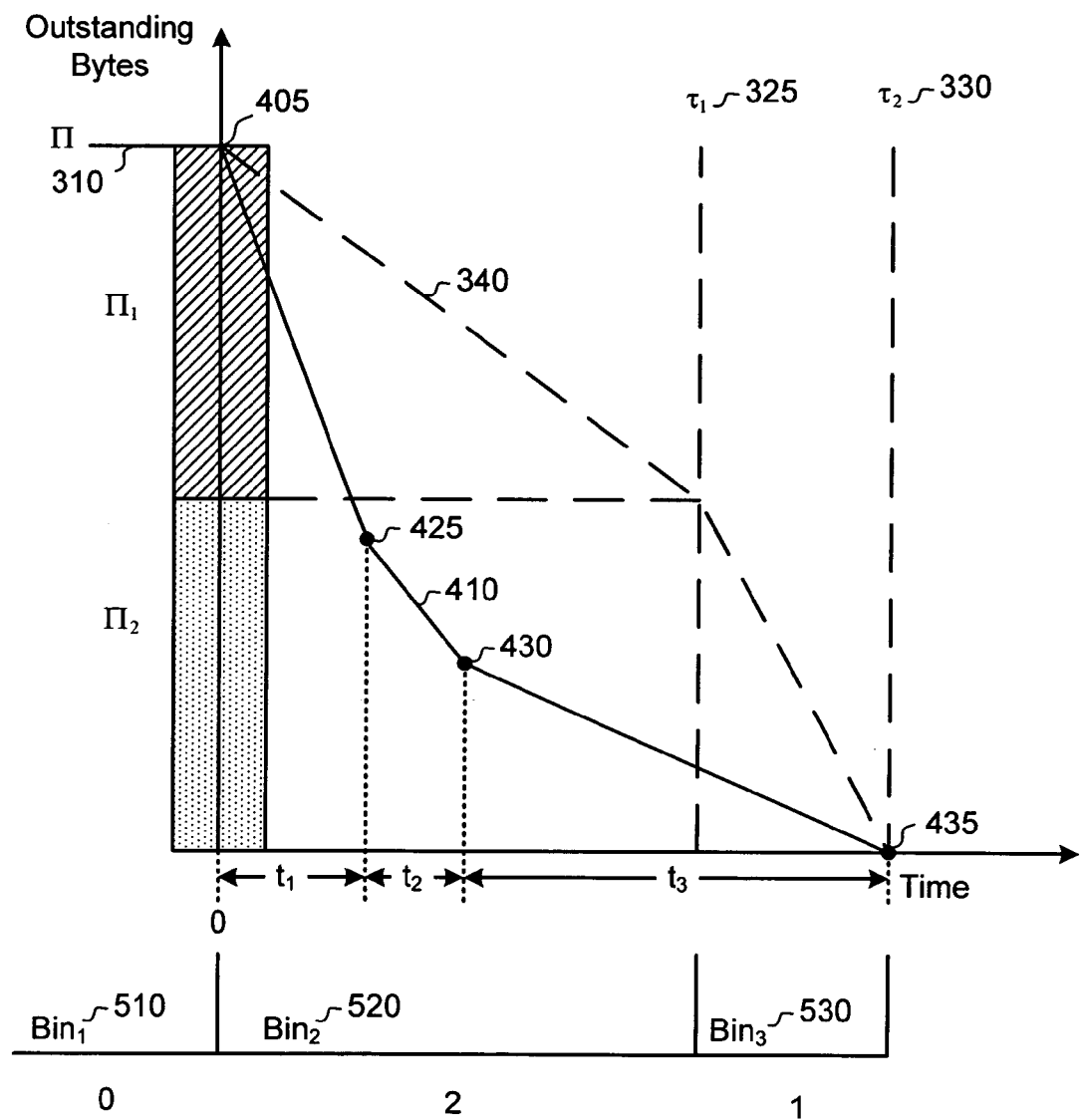
FIG. 4 is a block diagram illustrating the exemplary linear programming model of FIG. 3 along with an exemplary solution curve for expressing a cost-optimized schedule as a solution of a linear programming problem.

FIG. 4 illustrates a possible solution curve 410. In general, the curve 410 profiles a possible transmission schedule S 160 required to meet the deadlines $\tau_1$ at 325 and $\tau_2$ at 330. Thus, according to the curve 410 there are at least two possible switch points 425 and 430 which indicate a switch from transmitting over one transmission interface to another. The segment between 405 and 425 is the steepest indicating that the fastest transmission rate was applied at that time and between switch points 425 and 430 a slower rate was applied and later between switch points 430 and 435 an even slower rate was applied. Based on the assumption that more aggressive interfaces (e.g., higher speed interfaces that yield steeper curves) are more expensive than less aggressive (e.g., slower interfaces that yield a flatter curve), a cost-optimized solution is likely to be found below the upper bound curve 340. Thus, in this model, the polyhedron to be analyzed by the linear programming is an area of the quadrant bound by the curve 340.

The schedule solution curve 410 proposes using the most aggressive interface to start off with for a certain period of time $t_1$ 406 and gradually switching to less aggressive (and hence less expensive) interfaces over other periods of time (e.g., $t_2$ 426 and $t_3$ 431). It should be noted here that while FIG. 4 demonstrates the fact that all deadlines are met, it is not intuitive so as to whether the proposed schedule 410 minimizes the overall cost. That can be determined by applying linear programming techniques.

However, the cost optimized transmission schedule is likely not in the extremes. For example, one could propose using the most aggressive interface all the way through. While this would certainly result in meeting all deadlines, it may result in unnecessary expenses. While it is good to meet deadlines as early as possible, this must be weighed against the incurred cost of doing so. Another extreme approach one could try is to use the cheapest interface all the way through. While this is certainly a plausible solution, it may turn out in many cases that the deadlines are such that always using the cheapest interface might result in missed deadlines.

Thus, one general principle, as illustrated in FIG. 4, is to start aggressively and subsequently switching to less aggressive interfaces. This essentially yields a convex shaped curve. Starting off aggressively in some sense prepares the system better for the arrival of future unanticipated flows since, after a certain period of time, the system would have transferred a lot more data than if it had started off with the least aggressive interface; this leaves more scope for meeting new deadlines.

This point is important in the context of the problem because the linear programming solution will tell the system how long each interface must be used, but it does not determine the inherent order in which these interfaces are used. The problem can be simplified by assuming an order of interface use starting with the most aggressive interface and ending with using the least aggressive interface. This assumption does not add a constraint that every interface needs to be used in transmission. In fact, a cost-optimized schedule that meets all deadlines could require that some interfaces are never used. That is resolved by setting time duration $t_i$ associated with that interface in a schedule S as 0. For instance, a switch point is indicated at 435 to note that a switch occurred there, but the time allocated for transmission on the new interface onto which the switch occurred is, however, set to 0.

Starting off with the most aggressive interface not only determines an order, but it is a logical assumption, since it gives the system the best possible ordering for meeting all the deadlines. Thus, in casting the scheduling problem as a linear programming problem, the order of use interfaces is from the most aggressive to the least aggressive. Assuming there are k different interfaces, the time periods $t_k$ belonging to a schedule S represents the period of time t for which interface k should be used. In other words, $$\forall t_k \in S, t_h = \begin{cases} 0 & \text{if interface } k \text{ is not used} \\ > 0 & \text{if interface } k \text{ is used for time } t \end{cases}$$

The challenge for the cost-aware transmissions optimizer 150 of FIG. 1 is to determine the optimal schedule, which is one that:

minimizes the overall costs and meets all deadlines.

The schedule S 160 generated by cost-aware transmission optimizer 150 is then used as an input to the switching layer 170. The switching layer 170 engineers the actual switches between interfaces as specified by the schedule S 160. While the order of switches between interfaces is determined by starting with the most aggressive interface and moving to the least aggressive interface, deriving the timing of the switches is described in additional detail in the binning and linear programming sections below.

An Exemplary Linear Programming Solution Including Binning

The formulation of the problem of finding a cost optimized schedule, as described above, comprises time deadlines (e.g., $\tau_1$ at 325 and $\tau_2$ at 330 in FIG. 4) as hard constraints and cost as the soft constraint. This scenario suggests the use of linear programming techniques to solve the problem, since linear programming formulations can express objective functions as soft constraints and actual constraints as hard constraints. A general linear programming formulation is specified as follows:

$$\min \sum_{j=1}^{m} t_j c_j B_j$$

$$s.t. \ \forall \pi_i \in \Gamma, \sum_{j=1}^{i} \pi_j \geq t_1 B_1 + t_2 B_2 + \cdots + at_i,$$

where $\sum_{j=1}^{i-1} t_j + at_i = \tau_i$ for $a \in [0, 1]$

The formulation above indicates that the objective of the linear programming function is to minimize the total cost (e.g., sum of $c_j$) of transmission of data over m interfaces by deriving an optimal schedule S of time $t_j$ that each of the m interfaces will be used with their respective available bandwidths $B_j$. The other constraints include meeting delivery deadlines associated with each of the data blocks $\Pi_i$. Another constraint requires that the times $t_j$ be non-negative.

The general formulation above, however, does not specify where transitions between interfaces will occur with respect to the timing of the deadlines. Although a brute-force approach of considering all interleavings of transitions and deadlines could be incorporated into the linear-programming formulation, this leads to an overly complex formulation of the linear-programming problem that leads to an intractable combinatorial explosion. This problem is solved by applying the concept of binning. The insight behind this technique is that given a set of n deadlines and m interfaces, it is known there are at most m−1 total switches of transmission from one interface to another and bins are created between each set of deadlines, configured to have some number of switches taking place in each bin. A complete configuration, thus, partitions the m−1 switches into n+1 bins (with the t=0 being a bin unto itself to allow for the possibility of skipping the use of some interfaces at the beginning of the transmission). For each bin configuration, linear programming can be applied to solve for the best solution. The best overall solution is one which is the optimal solution across all bin configurations. Note that this also results in a combinatorial explosion that increases bin configurations at a rate that is O(n^m), but the semantics of the problem allow us to cull and effectively avoid having to compute solutions for a large portion of the bin configurations.

Figure 5:
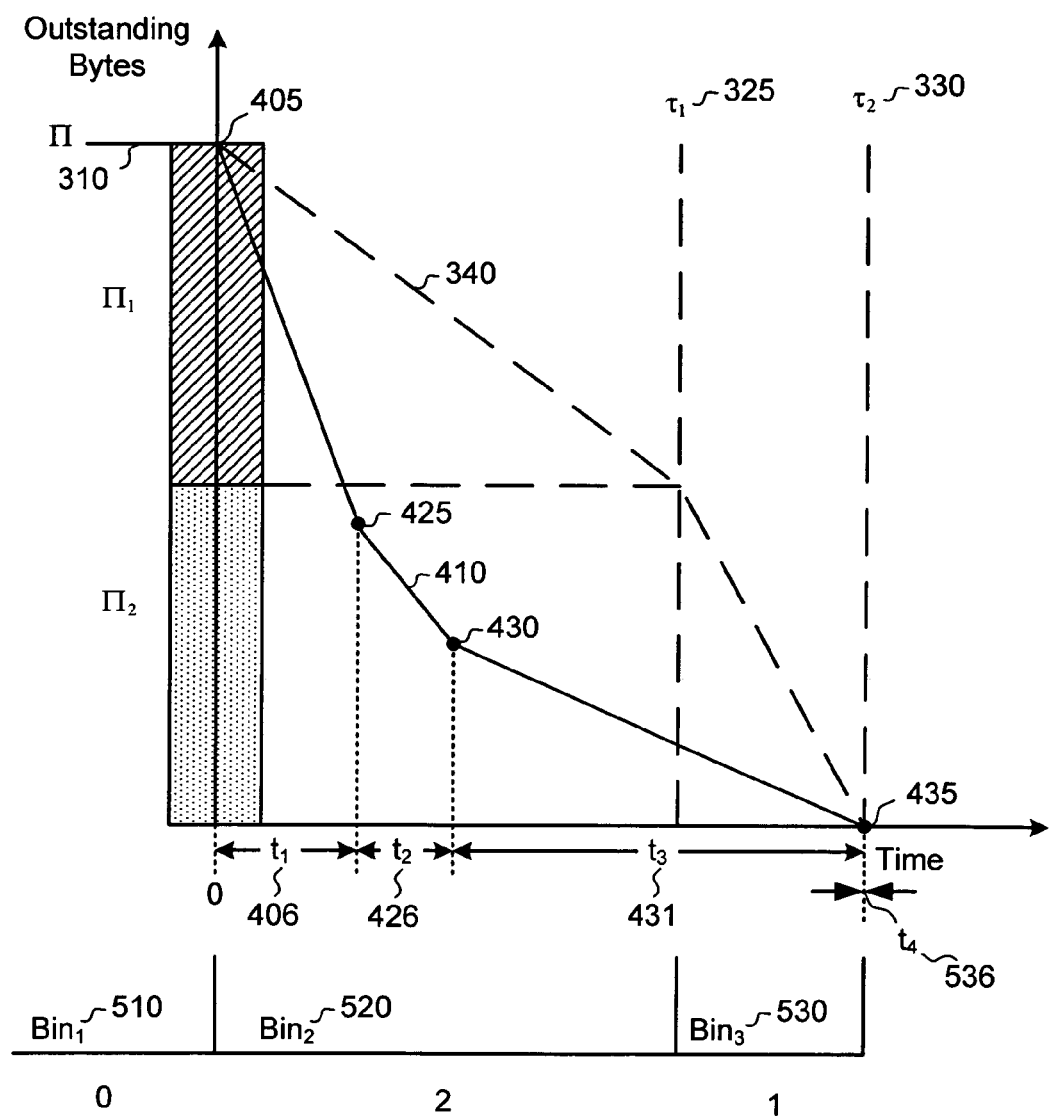
FIG. 5 is a block diagram illustrating the exemplary linear programming model of FIG. 4 along with conceptual time bins configured for expressing the linear programming problem including the appropriate delivery time constraints.

Bin configurations are enumerated first, and then each one results in a linear programming problem. For example, FIG. 5 illustrates a problem of determining a cost optimized transmission schedule over four interfaces and two deadlines (e.g., $\tau_1$ at 325 and $\tau_2$ at 330). The switch points 425, 430 and 435 indicate the timing of the switching between the four different interfaces.

We now focus on the formulation of a single bin configuration. The hard constraints of linear programming problem to be solved to derive the cost optimized transmission schedule (e.g., S comprising $t_1$ 406, $t_2$ 426, $t_3$ 431, and $t_4$ 536 in FIG. 5) can be formulated by arranging switches between interfaces according to time bins (e.g., $Bin_1$ 510, $Bin_2$ 520, and $Bin_3$ 530). The time bins (e.g., $Bin_1$ 510, $Bin_2$ 520, and $Bin_3$ 530) in the exemplary configuration shown in FIG. 5 are derived by dividing the time domain into time bins, such as $Bin_1$ 510 which covers time before any transmission has started, $Bin_2$ 520 which covers a time before the first deadline $\tau_i$ at 325 and a $Bin_3$ 530 which covers a time between the first deadline $\tau_i$ at 325 and the second deadline $T_2$ at 330. Alternatively, bins covering time after the second deadline can also be added but it is not included in this exemplary configuration of FIG. 5. In a first guess according to FIG. 5, the bin configuration [$Bin_1$ 510, $Bin_2$ 520, and $Bin_3$ 530] [0, 2, 1] indicates that no switches occurred prior to starting transmission (thus, also indicating that the transmission starts with most aggressive interface first) and progressively switching through the less aggressive interfaces. $Bin_2$ 520 has two switches 425 and 430 whereas $Bin_3$ 530 has one switch 435 totaling up to three different switches over the four different interfaces. The switch at $Bin_3$ 435 is a null switch since all bytes to be transmitted would have been exhausted by then. However, that need not always be the case since the switch point 435 could be anywhere in $Bin_3$ 530 in a [0, 2, 1] bin configuration.

Once a bin configuration is determined, as above, the linear programming problem of solving for an optimal schedule of the switching can be formulated with appropriate constraints and solved for that bin configuration. The following is an exemplary formulation of the linear programming problem for the bin configuration [0, 2, 1] as shown in FIG. 5:

$$\min \sum_{j=1}^{4} t_j c_j B_j$$

$$(t_1 B_1 + t_2 B_2 + (\tau_1 - (t_2 + t_1))B_3) \geq \Pi_1$$

$$(t_1 B_1 + t_2 B_2 + t_3 B_3) \geq (\Pi_1 + \Pi_2)$$

$$0 \leq \sum_{j=1}^{4} t_j \leq \tau_2$$

Thus, by the way of the binning technique the hard constraints of time deadlines can be expressed as above to solve the linear programming construct to also meet the soft constraint of optimized cost. FIG. 5 describes a bin configuration of [0, 2, 1]. However, given 4 interfaces other possible enumerations of bin configurations include [0, 0, 3,], [0, 1, 2], [1, 2, 0], [1, 1, 1], [1, 0, 2], [2, 0, 1], [2, 1, 0] and [3, 0, 0].

Figure 6:
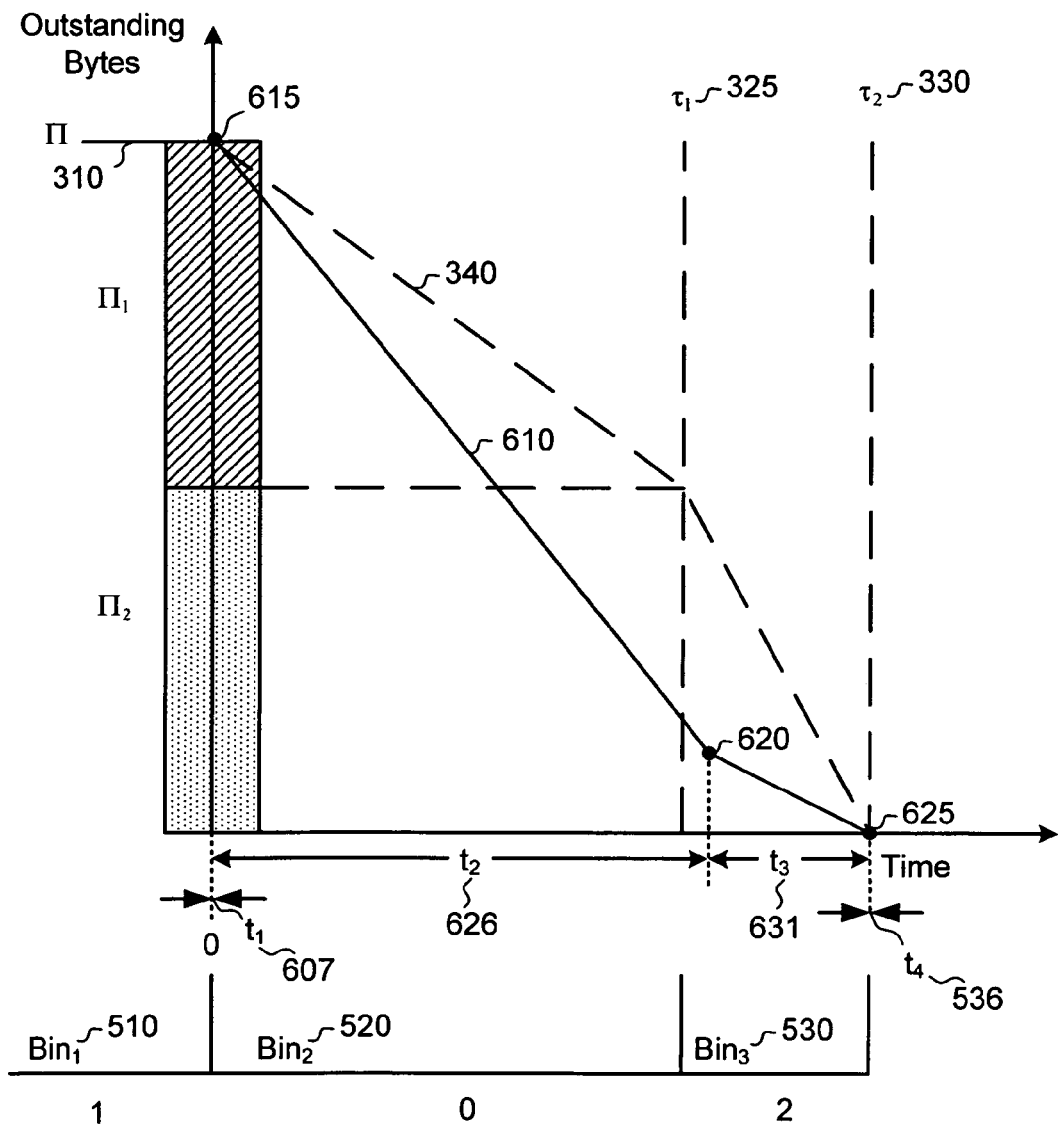
FIG. 6 is a block diagram also illustrating the exemplary linear programming model of FIG. 4 but with a different bin configuration than FIG. 5.

For instance, FIG. 6 illustrates a [1, 0, 2] bin configuration. In this configuration, along the curve 610, there is one switch 615 in $Bin_1$ 510, no switches in $Bin_2$ 520 and two switches 620 and 625 in $Bin_3$ 530. The times $t_j$ are shown as $t_1$ 607, $t_2$ 626, $t_3$ 631, and $t_4$ 536. Thus, a possible formulation of the linear programming model for this configuration could be as follows:

$$\min \sum_{j=1}^{4} t_j c_j B_j$$

$$(t_1 B_1 + (\tau_1 - t_1)B_2) \geq \Pi_1$$

$$(t_1 B_1 + t_2 B_2 + t_3 B_3) \geq (\Pi_1 + \Pi_2)$$

$$0 \leq \sum_{j=1}^{4} t_j \leq \tau_2$$

Figure 7:
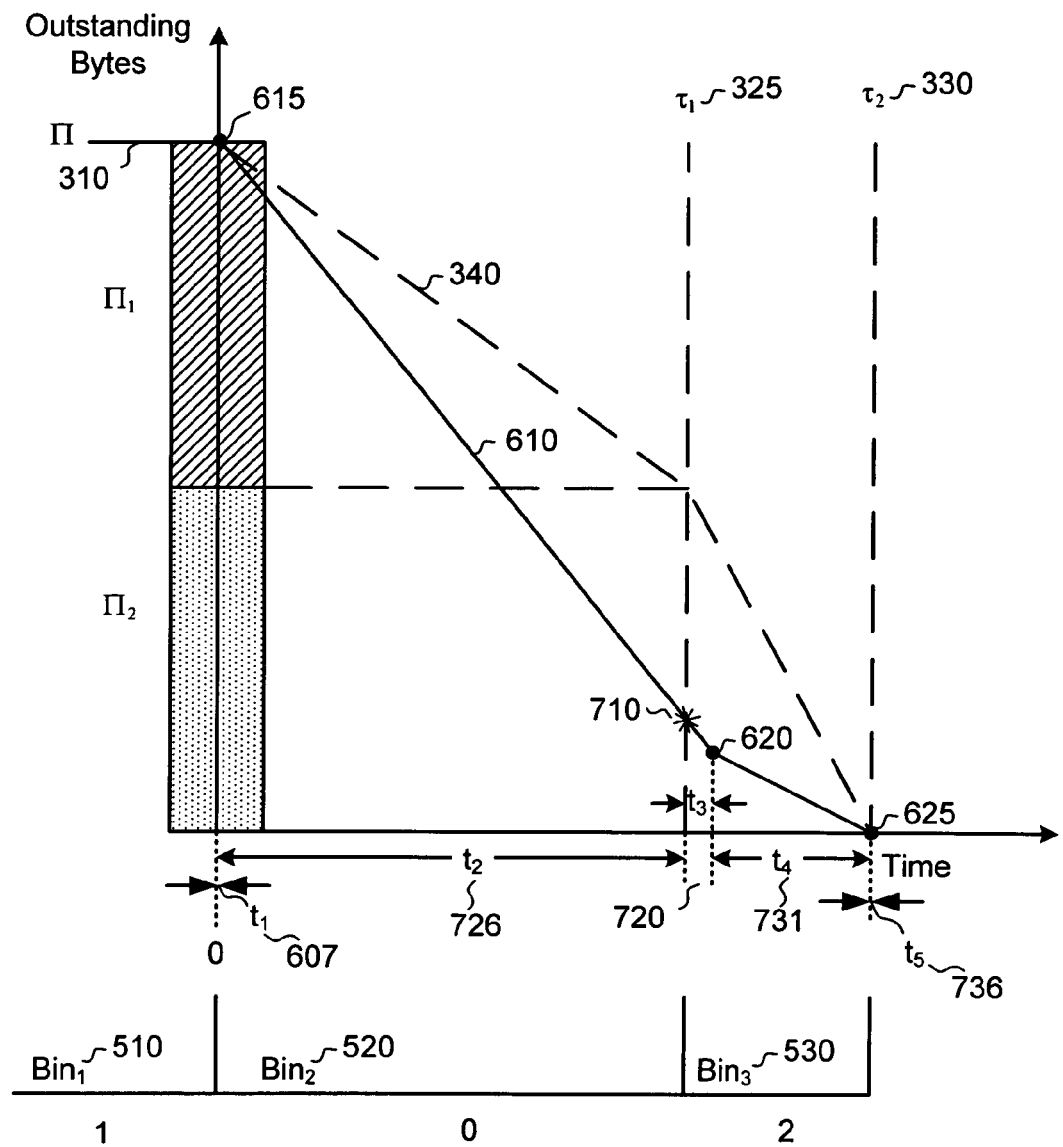
FIG. 7 is a block diagram illustrating the exemplary linear programming model of FIG. 4 but with faux switch points added onto the curve at deadlines.

In the above linear programming formulation it is possible that the solution could turn out to be negative if some $t_j B_j \gg \Pi_i$ and this could affect the canonical form of the linear programming (when solved using the Simplex algorithm). Therefore, to simplify the above formulation, the interfaces are split across deadlines as demonstrated in FIG. 7. To cause the split, a faux switch 710 (or pseudo switch 710) is added across deadlines (e.g., $\tau_1$ at 325). This change also adds another time variable $t_3$ at 720 to the set $t_1$ 607, $t_2$ 726, $t_4$ 731, and $t_5$ 736. The faux switch 710 is really not a switch since the rate of transmission after it remains the same as before (e.g., the slope of the curve 610 remains the same beyond the point at 710). However, this formulation has the advantage of avoiding the unwanted negative solution problem since now the linear programming formulation is simplified as follows:

$$\min \sum_{j=1}^{4} t_j c_j B_j$$

$$(t_1 B_1 + t_2 B_2) \geq \Pi_1$$

$$(t_1 B_1 + t_2 B_2 + t_3 B_3 + t_4 B_4) \geq (\Pi_1 + \Pi_2)$$

$$0 \leq \sum_{j=1}^{4} t_j \leq \tau_2$$

Such a formulation can be applied to any of the various possible bin configurations (e.g., listed above). Once the solution curve is identified for each of the configurations, the least costly of the solutions can be selected as the optimized transmission schedule solution. This process is described in additional detail herein below.

Figure 8:
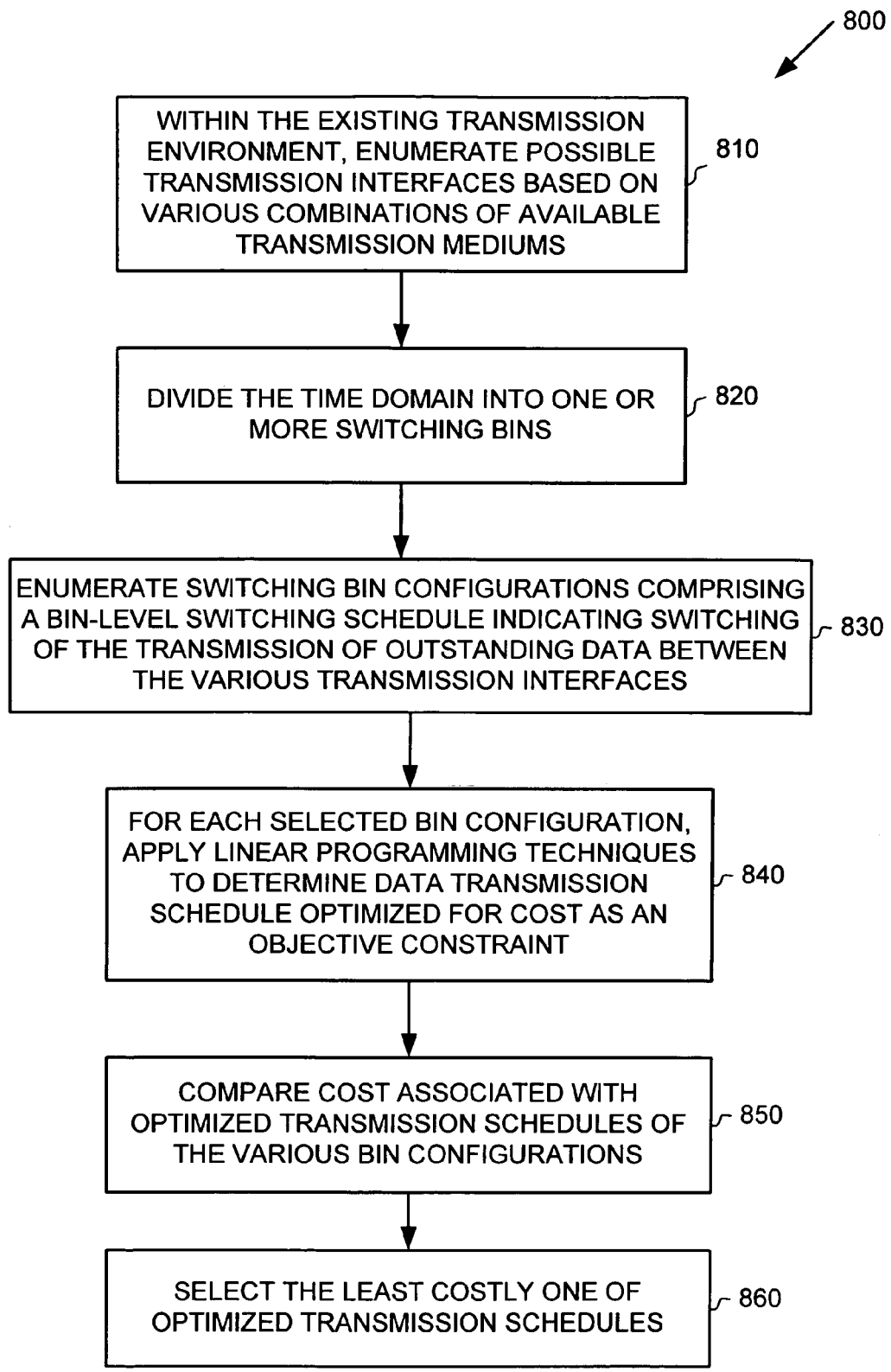
FIG. 8 is a flow diagram describing an exemplary detailed method for determining a cost-optimized schedule for transmitting data over a heterogeneous network by applying linear programming techniques in conjunction with a binning pre-processing technique.
Figure 9:
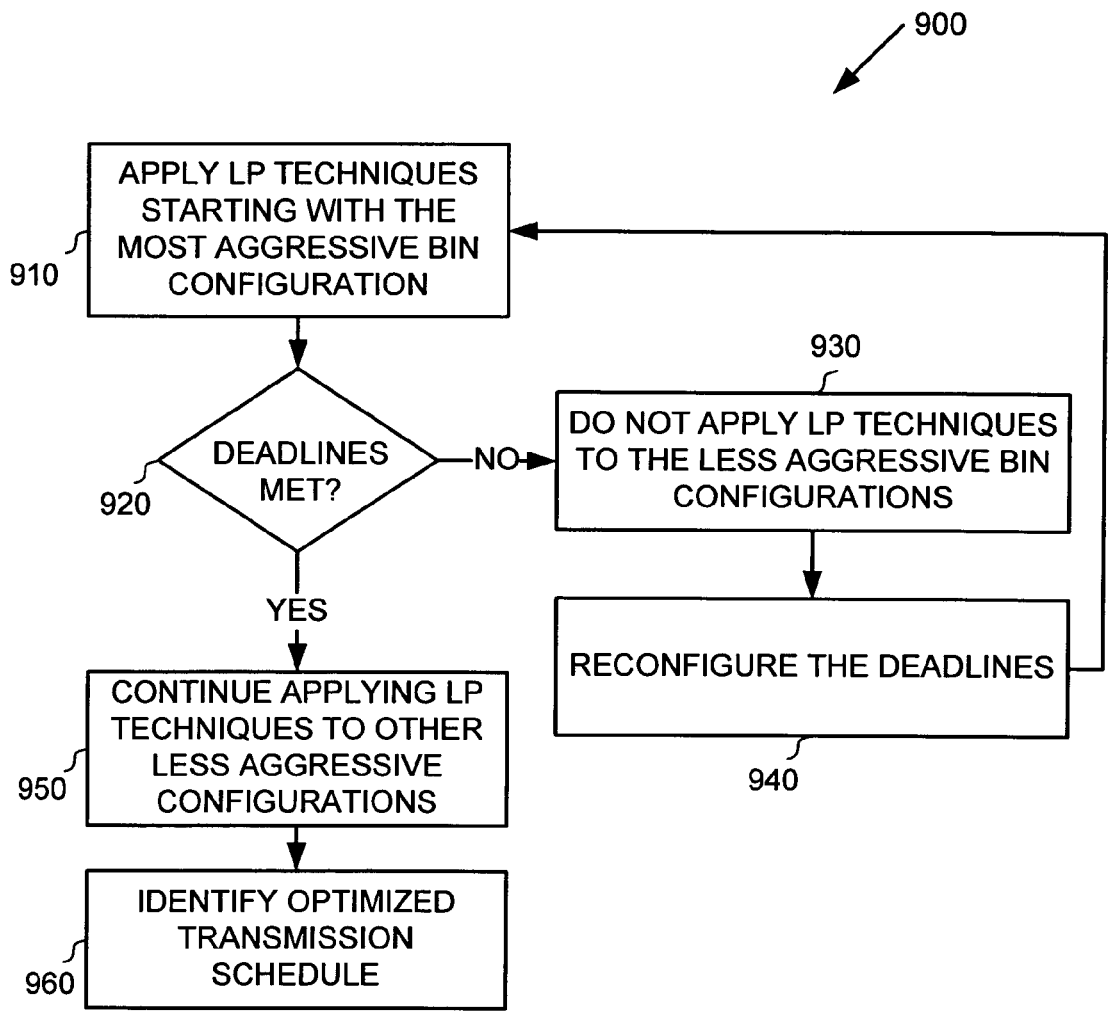
FIG. 9 is a flow diagram describing an exemplary method of selecting the appropriate bin configurations for the application of linear programming techniques to avoid potentially wasteful processing.

An Exemplary Overall Process for Applying Linear Programming Techniques to Determine Cost-Aware Transmission Schedules Over a Heterogeneous Network FIG. 8 illustrates an exemplary method 800 for determining cost-aware transmission schedules based on applying linear programming techniques. At 810, based on a given transmission environment, the transmission interfaces comprising one or more transmission mediums, or combinations thereof, are enumerated. At 820, the time domain over which the schedule will be derived is divided into one or more switching bins. The bins (e.g., 510, 520 and 530 of FIG. 5), as described above, are time intervals over which an estimated number of switches (e.g., 425, 430 and 435) are expected to occur. This, among other things, allows the hard constraints of time deadlines to be effectively expressed. Thus, at 830, based at least in part on the number of available interfaces, various binning configurations are enumerated to express bin-level estimated switching schedules indicating, at the bin-level, the various possible switching configurations. At 840, for selected bin configurations, linear programming techniques are applied to derive a cost-optimized transmission schedule having enumerated deadlines as hard constraints and minimizing cost as the soft constraint. This yields several schedules (e.g., one each for each of the bin-configurations selected for analysis). As explained in further detail below, there may not be a need to apply linear programming techniques to every one of the enumerated bin-configurations. Several exemplary techniques for selecting bin-configurations for further analysis are described below. At 850, the costs associated with each of the several different possible candidates for the cost optimized transmission schedule are compared and at 860, the least costly of the candidates is selected as the schedule to be implemented. This schedule S (e.g., at 160 of FIG. 1) is then used by the switching layer 170 to implement a cost-optimized transmission of data that also meets the delivery deadlines.

In one embodiment, the above method 800 is repeated anytime the transmission environment changes. For instance, such changes may include changes in the number of, or the bandwidth of the interfaces available for transmission. This also addresses the possible unexpected events such as malfunctioning interfaces or other changes in the availability of some interfaces. It could also include a change in the deadlines or even a change in amount of data (e.g., Π 310 of FIG. 5) to be transmitted. The steps of method 800 are exemplary; other embodiments can combine or add steps.

The complexity involved in applying linear programming techniques can explode with an increase in the number of data blocks and the deadlines associated therewith or the interfaces available for transmission of the data blocks, for instance. Thus, one technique of simplifying the method 800 of FIG. 8 is to select a number of data blocks for which the scheduling solution is sought. This in essence has the effect of breaking up the problem into manageable chunks. The number of data blocks so selected for processing is left up to a user as an implementation detail.

Also, as noted above, not all bin configurations need to be analyzed for deriving a cost optimized transmission schedule. In one exemplary method 900, at 910, the most aggressive bin configuration is selected first for determining a scheduling solution. For instance, with reference to FIG. 5, among the possible enumerated bin-configurations for FIG. 5 with 4 different transmission interfaces and three possible switches to schedule, the most aggressive bin configuration would be one that would call for staying with the most aggressive interface for a long period and causing all three switches to occur in the last bin $Bin_3$ 530. Such a configuration in this instance would be [0, 0, 3]. If however, at 920, any of the time deadline constraints are not met with this aggressive configuration, then it is evident that less aggressive bin configurations will not yield an acceptable solution. Therefore, at 930, these bin configurations are not analyzed further by the way of applying linear programming techniques. Instead, at 940, the deadlines are reconfigured (e.g., by adding some suitable time ϵ) and the process 900 is re-run. However, if at 920 the deadlines are met, the less aggressive bin configurations are explored at 950 until the cost optimized transmission schedule is identified at 960. This reduces at least some unnecessary computation.

Similarly, the optimal solution tends to use less aggressive interfaces for more time, and so if a bin configuration, e.g., [2, 1, 0], that uses a less aggressive schedule admits to a solution that satisfies all the hard constraints, then bin configurations that are more aggressive than it, e.g., [2, 0, 1] or [1, 1, 1], do not need to be considered. This also reduces some unnecessary computation.

Together, these culling techniques can be used to do a partitioned search over the bin configuration space, such that the number of bin configurations for which linear programming must be conducted is dramatically reduced.

Exemplary Methods of Adaptive Scheduling

It should be noted that the algorithm described above is static to the extent that it assumes all data chunks and deadlines are known before the optimal schedule is computed. This can be unrealistic for many scenarios. In one exemplary implementation an extension for handling changes in the transmission environment is simply to re-run the scheduling algorithm with the current changed conditions each time an event causes a change in the parameters. The changes may include but are limited such changes as the arrival of a new request to send new data and a change in the interface characteristics (e.g., in its bandwidth capacity for instance). In such cases, the original algorithm can be simply re-run based on the changed parameters.

The core algorithm as described above results in a cost-optimal schedule for the static case, but with new data chunks coming in, it is possible that even a recomputed schedule will not be able to meet all data deadlines. In order to create a buffer for this situation, in one exemplary implementation, the core algorithm can be modified to shorten all deadlines by a percentage, s, between 0 and 1. The algorithm, which can then be run without other changes, effectively runs with some buffer (and hence, likely in a more costly manner), so that when new data arrives, it is more likely to be accommodated.

In another exemplary implementation, applications (such as video streaming) that expect a constant bandwidth available over the channel can be accommodated by allocating the desired bandwidth to such applications. The optimized schedule can then be calculated by reducing the interface bandwidths to be scheduled by the already allocated bandwidth, and then running the cost-optimized scheduling algorithm as above.

Exemplary Network Interfaces

Figure 10A:
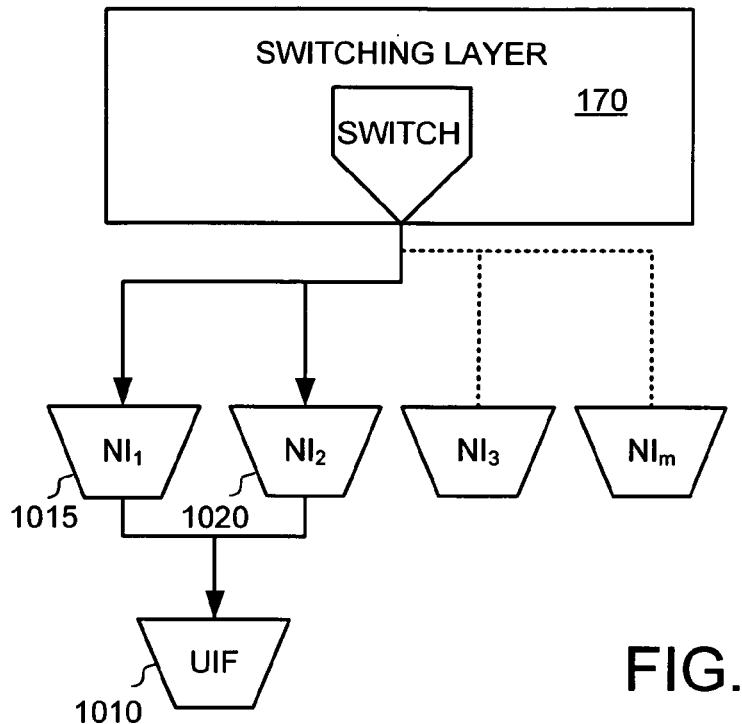
FIG. 10A is a block diagram illustrating one exemplary configuration of a unified transmission interface comprising a plurality of distinct interfaces.
Figure 10B:
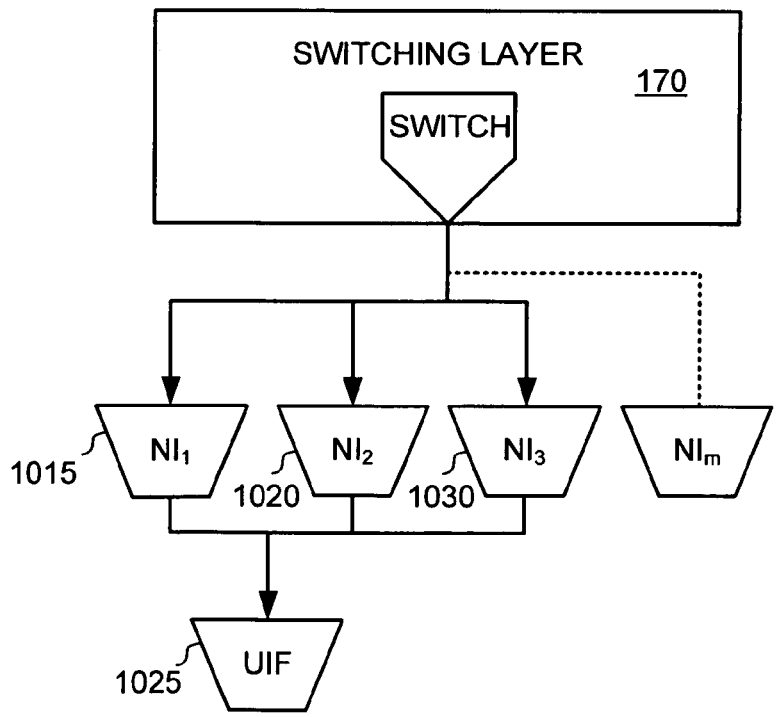
FIG. 10B is a block diagram illustrating another exemplary configuration of a unified transmission interface.

Network interfaces available for scheduling transmission can be distinct actual mediums of transmission such as the SMS interface $NI_1$ at 122, DSL interface $NI_2$ at 123 and WiFi interface $NI_3$ at 125 of FIG. 1, Bluetooth, GPRS, etc. Also, the bandwidth available for scheduling can also be viewed as the bandwidth of a unified interface (e.g., 1010 of FIG. 10A) comprising some combination of the bandwidth available on distinct interfaces (e.g., 1015 and 1020) as shown in FIG. 10A. Thus, if m distinct transmission mediums are available, then the number of different available network interface configurations would be $2^m$. Thus, when enumerating the various network interfaces (e.g., 810) for determining an optimal schedule, if m distinct interfaces (e.g., SMS, DSL, WiFi, and so forth) are available, then the number of unified network interfaces enumerated equals $2^m$. This enumeration includes the scenarios where just one of the distinct interfaces is available at any one time. FIG. 10B illustrates another network interface configuration having a different unified interface 1025 which is a combination of three distinct interfaces 1015, 1020 and 1030.

Besides, data blocks that have outstanding delivery with deadlines associated therewith some other parts of the data flow 115 (FIG. 1) may comprise data of higher priority such that they could have a portion of the bandwidth reserved for their transmission on any of the one or more interfaces (e.g., 1015, 1020 and 1030 of FIG. 10B). Such an event can be accommodated by the selectively reducing bandwidth available as a whole for transmission by the amount of the bandwidth requested to be reserved for high priority use but treating the problem of scheduling the same as described above.

Exemplary Computing Environment

Figure 11:
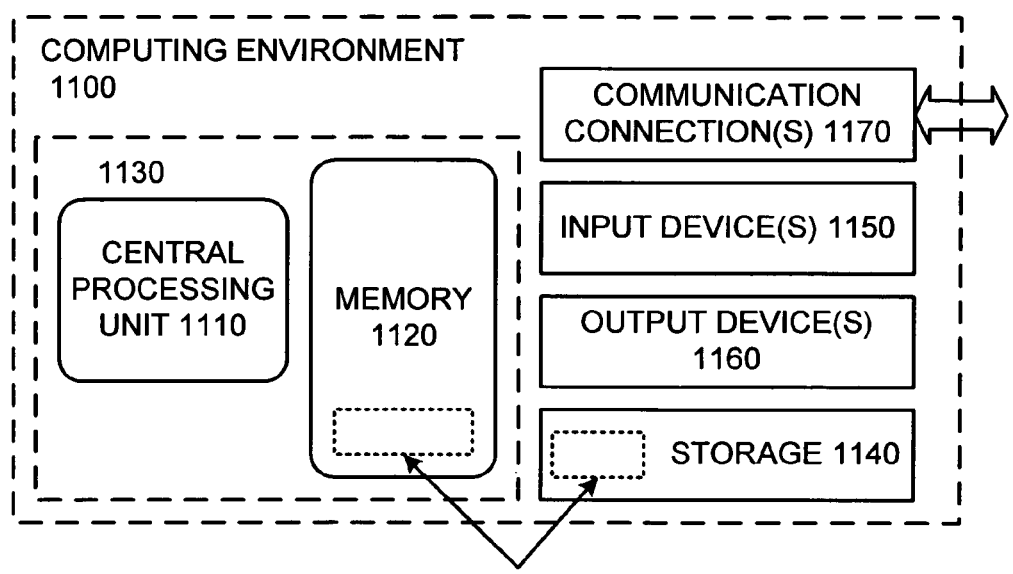
FIG. 11 is a block diagram illustrating an exemplary computing environment for implementing the methods of scheduling data transmission in a cost-aware manner over a heterogeneous network.

FIG. 11 and the following discussion are intended to provide a brief, general description of an exemplary computing environment in which the disclosed technology may be implemented. Although not required, the disclosed technology including the cost-aware data transmission optimizer (150 of FIG. 1) was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 11 illustrates a generalized example of a suitable computing environment 1100 in which described embodiments may be implemented. The computing environment 1100 is not intended to suggest any limitation as to scope of use or functionality of the technology, as the present technology may be implemented in diverse general-purpose or special-purpose computing environments.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 implementing the described methods for scheduling data transmission over a heterogeneous network in a cost-aware manner. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1180 implementing methods scheduling data transmission over a heterogeneous network in a cost-aware manner.

The input device(s) 1150 may be a touch input device, such as a keyboard, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, compressed graphics information, or other data in a modulated data signal.

Computer-readable media are any available media that can be accessed within a computing environment 1100. By way of example, and not limitation, with the computing environment 1100, computer-readable media include memory 1120, storage 1140, communication media (not shown), and combinations of any of the above.

In view of the many possible embodiments to which the principles of the disclosed technology may be applied, it should be recognized that the illustrated embodiments are only preferred examples of the technology and should not be taken as limiting the scope of the following claims. We, therefore, claim as our invention all that comes within the scope and spirit of these claims.

We claim:

1. A computer-implemented method of transmitting data over a heterogeneous network in a cost-aware manner, the method comprising:
receiving data to be transmitted configured as data blocks correspondingly associated with data indicative of deliver-by deadlines;
receiving data indicating bandwidth capacity currently available over one or more heterogeneous transmission interfaces to the network for transmitting the data blocks;
receiving transmission cost data correspondingly associated with the one or more heterogeneous interfaces of the network;
based on the deliver-by deadlines, the available bandwidth capacity and the transmission costs, applying linear programming techniques to determine a cost-optimized transmission schedule that meets the deliver-by deadlines while minimizing transmission costs; and
causing the data to be transmitted according to the cost-optimized transmission schedule, wherein the transmission schedule specifies an order of transmission of the data blocks as starting with a data block with an earliest deliver-by deadline and ending with a data block with a latest deadline, and wherein the transmission schedule further specifies an order of use of the one or more of the transmission interfaces available for data transmission as starting with a most aggressive transmission interface and ending with a least aggressive transmission interface.

2. A computer-implemented method of transmitting data over a heterogeneous network in a cost-aware manner, the method comprising:
receiving data to be transmitted configured as data blocks correspondingly associated with data indicative of deliver-by deadlines;
receiving data indicating bandwidth capacity currently available over one or more heterogeneous transmission interfaces to the network for transmitting the data blocks;
receiving transmission cost data correspondingly associated with the one or more heterogeneous interfaces of the network;
based on the deliver-by deadlines, the available bandwidth capacity and the transmission costs, applying linear programming techniques to determine a cost-optimized transmission schedule that meets the deliver-by deadlines while minimizing transmission costs; and
causing the data to be transmitted according to the cost-optimized transmission schedule, wherein the one or more transmission interfaces available for transmitting data comprises a unified transmission interface derived based on some combination of actual distinct transmission interfaces to the heterogeneous network.

3. The method of claim 2 wherein the bandwidth capacity of the unified transmission interface is a sum of the bandwidths of the distinct actual transmission interfaces.

4. A computer-implemented method of transmitting data over a heterogeneous network in a cost-aware manner, the method comprising:
receiving data to be transmitted configured as data blocks correspondingly associated with data indicative of deliver-by deadlines;
receiving data indicating bandwidth capacity currently available over one or more heterogeneous transmission interfaces to the network for transmitting the data blocks;
receiving transmission cost data correspondingly associated with the one or more heterogeneous interfaces of the network;
based on the deliver-by deadlines, the available bandwidth capacity and the transmission costs, applying linear programming techniques to determine a cost-optimized transmission schedule that meets the deliver-by deadlines while minimizing transmission costs; and
causing the data to be transmitted according to the cost-optimized transmission schedule, wherein applying linear programming techniques comprises applying Simplex linear programming algorithm to solve for the cost-optimized transmission schedule based on setting the deliver-by deadlines as hard constraints of the algorithm and minimizing transmission cost as an objective constraint.

5. The method of claim 4 further comprising
shortening one or more of the deliver-by deadlines prior to determining the cost-optimized transmission schedule.

6. The method of claim 4 further comprising
allocating a selected amount of bandwidth for a dedicated transmission and reducing the bandwidth capacity currently available for scheduling transmission over the one or more heterogeneous transmission interfaces by the allocated amount prior to determining the cost-optimized transmission schedule.

7. The method of claim 4 wherein the transmission schedule comprises units of time indicating a duration of time for which the one or more of the transmission interfaces are to be used for transmitting the data.

8. The method of claim 4 wherein the transmission schedule specifies an order of transmission of the data blocks as staffing with a data block with an earliest deliver-by deadline and ending with a data block with a latest deadline.

9. A computer-implemented method of transmitting data over a heterogeneous network in a cost-aware manner, the method comprising:
receiving data to be transmitted configured as data blocks correspondingly associated with data indicative of deliver-by deadlines;
receiving data indicating bandwidth capacity currently available over one or more heterogeneous transmission interfaces to the network for transmitting the data blocks;
receiving transmission cost data correspondingly associated with the one or more heterogeneous interfaces of the network;
pre-processing comprising by:
dividing a time domain over which the linear programming techniques are to be applied into a plurality of time bins;
deriving a plurality of bin configurations comprising bin-level schedules for switching of transmission between the one or more transmission interfaces; and
formulating the deliver-by deadlines as hard constraints for applying the linear programming techniques according to the bin configurations;
based on the deliver-by deadlines, the available bandwidth capacity and the transmission costs, applying linear programming techniques to determine a cost-optimized transmission schedule that meets the deliver-by deadlines while minimizing transmission costs; and causing the data to be transmitted according to the cost-optimized transmission schedule.

10. The method of claim 9 wherein applying the linear programming technique to determine a cost-optimized transmission schedule comprises:
applying the linear programming techniques to each bin configuration for determining a bin-level cost-optimized transmission schedule; and comparing the bin-level cost-optimized transmission schedule of the various bin configurations and selecting least costly one of the bin-level cost-optimized transmission schedules as the cost-optimized transmission schedule for transmitting the data over the heterogeneous network.

11. The method of claim 10 further comprising enumerating the bin configurations wherein the number of different bin configurations enumerated is based at least in part on the number of the transmission interfaces available for transmitting data.

12. The method of claim 11 wherein applying the linear programming techniques to each bin configuration comprises:
applying the linear programming until determining a first bin configuration that yields a transmission schedule that meets the deliver-by deadlines; and
selecting for further analysis a next bin configuration that is less aggressive than the first bin configuration to determine the cost-optimized transmission schedule that meets the deliver-by deadlines while minimizing transmission costs.

13. The method of claim 11 wherein applying the linear programming techniques to each bin configuration comprises applying the linear programming techniques starting with the most aggressive bin configuration and if the most aggressive bin configuration yields a transmission schedule that fails to meet any of the deliver-by deadlines then suspending applying the linear programming technique to less aggressive bin configurations.

14. The method of claim 13 further comprising extending the failed deliver-by deadlines and re-applying the linear programming techniques.

15. A computer-implemented method of transmitting data over a heterogeneous network in a cost-aware manner, the method comprising:
receiving data to be transmitted configured as data blocks correspondingly associated with data indicative of deliver-by deadlines;
receiving data indicating bandwidth capacity currently available over one or more heterogeneous transmission interfaces to the network for transmitting the data blocks;
receiving transmission cost data correspondingly associated with the one or more heterogeneous interfaces of the network;
based on the delivery-by deadlines, the available bandwidth capacity and the transmission costs, applying linear programming techniques to determine a cost-optimized transmission schedule that meets the deliver-by deadlines while minimizing transmission costs;
reapplying the linear programming techniques to determine the cost-optimized transmission schedule each time one or more parameters associated with transmission environment changes; and
causing the data to be transmitted according to the cost-optimized transmission schedule.

16. The method of claim 15 wherein the changes to the parameters comprises one or more of new data blocks to be delivered, new deliver-by deadlines, the changes to the data indicating bandwidth capacity and changes to the transmission cost data.

17. A computer system for scheduling transmission of data in a cost-aware manner over a set of one or more heterogeneous network interfaces of a network, the system comprising:
memory for storing computer executable instructions; and
at least one processor operable in conjunction with the instructions stored in the memory to determine a cost-optimized schedule for transmitting the data over the network by performing the following:
receiving data blocks to be transmitted over the network, the data blocks being correspondingly associated with deliver-by deadlines;
receiving data indicative of bandwidth available for use in the data transmission;
receiving data indicative of transmission costs correspondingly associated with the one or more of the network interfaces; and
applying linear programming techniques using the deliver-by deadlines as hard constraints and minimizing the transmission costs as objective constraints to determine the cost-optimized schedule.

18. The system of claim 17 wherein the linear programming techniques are applied with a schedule constraint requiring that the data blocks be scheduled for transmission in the order of their respective deliver-by deadlines with the data block with an earliest deliver-by deadline being scheduled first.

19. The system of claim 18 wherein the linear programming techniques are applied with a schedule constraint requiring that the network interfaces be scheduled for use in transmission in order of their respective speed with a most aggressive interface being scheduled first.

20. The system of claim 17 further operable for reapplying linear programming techniques to determine cost-optimized schedule upon determining a change in transmission environment.

21. The system of claim 17 further operable for receiving notice that at least a portion of the bandwidth available for use in the data transmission is reserved for data of high priority and upon receiving the notice being further operable for determining a new cost-optimized transmission schedule by assuming that the reserved portion of the bandwidth is not available for scheduling.

22. The system of claim 17 further operable for pre-processing prior to applying the linear programming techniques, the pre-processing comprising:
dividing a time domain over which the linear programming techniques are to be applied into a plurality of time bins;
deriving a plurality of bin configurations comprising bin-level schedules for switching of transmission between the available network interfaces; and
expressing the hard constraints for applying the linear programming techniques according to the bin configurations.

23. The system of claim 22 further operable for applying the linear programming techniques to each of the bin configurations to determine a cost-optimized schedule for that bin configuration and selecting least costly one of the cost-optimized schedules correspondingly associated with the bin configurations.

24. The system of claim 22 wherein the bins are derived based at least in part on the deliver-by deadlines and the bin configurations depend on the number of available network interfaces.

* * * * *